(12) United States Patent
Melman

(10) Patent No.: US 9,240,898 B1
(45) Date of Patent: Jan. 19, 2016

(54) INTEGRATING VLAN-UNAWARE DEVICES INTO VLAN-ENABLED NETWORKS

(75) Inventor: David Melman, Hakerem (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 1285 days.

(21) Appl. No.: 12/393,885

(22) Filed: Feb. 26, 2009

Related U.S. Application Data

(60) Provisional application No. 61/032,223, filed on Feb. 28, 2008.

(51) Int. Cl.
   *H04L 12/46* (2006.01)

(52) U.S. Cl.
   CPC ........ *H04L 12/4625* (2013.01); *H04L 12/4633* (2013.01); *H04L 12/4645* (2013.01)

(58) Field of Classification Search
   USPC ............................................. 370/392, 395.53
   See application file for complete search history.

(56) References Cited

U.S. PATENT DOCUMENTS

| | | | |
|---|---|---|---|
| 6,181,699 B1* | 1/2001 | Crinion et al. ................. | 370/392 |
| 6,252,888 B1* | 6/2001 | Fite et al. ...................... | 370/466 |
| 6,680,945 B1* | 1/2004 | Merchant et al. ........ | 370/395.53 |
| 7,212,531 B1 | 5/2007 | Kopelman et al. | |
| 7,386,699 B1 | 6/2008 | Bishara | |
| 7,424,019 B1 | 9/2008 | Kopelman et al. | |
| 7,817,633 B1* | 10/2010 | Parker et al. .................. | 370/392 |
| 7,876,704 B1* | 1/2011 | Bims et al. ..................... | 370/254 |
| 7,978,700 B2 | 7/2011 | Kopelman et al. | |
| 8,054,744 B1 | 11/2011 | Bishara et al. | |
| 8,279,871 B1 | 10/2012 | Sivan et al. | |
| 2002/0027906 A1* | 3/2002 | Athreya et al. ............... | 370/386 |
| 2003/0035398 A1* | 2/2003 | Sato ............................... | 370/338 |
| 2004/0228319 A1* | 11/2004 | Melville et al. ............... | 370/349 |
| 2005/0141519 A1* | 6/2005 | Rajgopal et al. .......... | 370/395.32 |
| 2006/0039378 A1* | 2/2006 | Medina et al. ................ | 370/392 |
| 2006/0126616 A1* | 6/2006 | Bhatia ........................... | 370/389 |
| 2007/0171918 A1* | 7/2007 | Ota et al. .................. | 370/395.53 |
| 2007/0195725 A1* | 8/2007 | Iino et al. ...................... | 370/328 |
| 2007/0201379 A1 | 8/2007 | Kondapalli | |
| 2007/0223388 A1 | 9/2007 | Arad et al. | |
| 2008/0069024 A1* | 3/2008 | Iino .............................. | 370/313 |
| 2008/0117910 A1* | 5/2008 | Page ............................. | 370/392 |
| 2008/0225853 A1 | 9/2008 | Melman et al. | |
| 2008/0240113 A1 | 10/2008 | Arad et al. | |
| 2008/0259924 A1* | 10/2008 | Gooch et al. .................. | 370/392 |

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, May 7, 2003.

(Continued)

*Primary Examiner* — Jackie Zuniga Abad

(57) ABSTRACT

Methods and apparatus for integrating VLAN-unaware devices into VLAN-enabled networks are described. For example, a method of assigning a virtual local area network identifier (VID) to a data unit may include receiving a data unit encapsulated in a wireless header from a source host via a wireless access point, wherein the data unit is addressed to a target host. A VID is determined based at least in part on an identifier of a wireless network included in the wireless header, and the VID is assigned to the data unit.

21 Claims, 4 Drawing Sheets

(56) References Cited

OTHER PUBLICATIONS

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Mar. 8, 2002.
A. S. Tanenbaum, "Computer Networks—Fourth Edition", 2003, 1996 *Peason Education, Inc.*, 4.7.6, pp. 328-336.
B. Claise "Cisco Systems NetFlow Services Export Version 9", RFC 3954, *The Internet Society*, Oct. 2004.
K. Pagiamtzis et al. "Content-Addressable Memory (CAM) Circuits and Architectures: A Tutorial and Survey," *IEEE Journal of Solid-State Circuits*, vol. 31, No. 3, pp. 712-727, Mar. 2006.
Quittek et al., "Requirements for IP Flow Information Export (IPFIX)," RFC 3917, *The Internet Society* (2004).
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
"CAPWAP Split MAC Bridging", Michael Vakulenko, Jan. 2007, 23 pages.
IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).
IEEE Std 802.11-2007 (revision of IEEE Std. 802.Nov. 1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
Chen, "Home Network Basis: Transmission Environments and Wired/Wireless Protocols," *Prentice Hall*, pp. 1-26 (Jul. 2003).

\* cited by examiner

# INTEGRATING VLAN-UNAWARE DEVICES INTO VLAN-ENABLED NETWORKS

CROSS-REFERENCE TO RELATED APPLICATION

This application claims the benefit of U.S. Provisional Patent Application No. 61/032,223, entitled "WLAN Switch VLAN Assignment of 802.11 Frames," which was filed on Feb. 28, 2008, the entire disclosure of which is hereby incorporated by reference herein.

FIELD OF TECHNOLOGY

The present disclosure relates generally to communication networks and, more particularly, to virtual local area networks.

BACKGROUND

Virtual local area networks (VLANs) are commonly used in computer networks to collect devices and/or systems coupled to a given computer network into logical groups. Specifically, IEEE 802.1Q has standardized the use of VLANs in local area networks. For example, a company or an educational institution may provide independent VLANs for various groups or departments within a company or university to reflect the organizational structure (rather than the physical layout, for instance) of the company or university.

In order for a VLAN-enabled computer network to function effectively, devices and/or systems coupled to the computer network may need to include support for VLAN-related functionality. Because some devices and/or systems used in computer networks may not have support for VLAN functionality, it may be necessary to provide special support in order to integrate such devices and/or systems into a VLAN-enabled network.

SUMMARY

The present disclosure provides methods and apparatus for integrating VLAN-unaware devices into VLAN-enabled networks.

In one embodiment, a method of assigning a virtual local area network identifier (VID) to a data unit may include receiving a data unit encapsulated in a wireless header from a source host via a wireless access point, the data unit addressed to a target host. The method may further include determining a VID based at least in part on an identifier of a wireless network included in the wireless header. The method may further include assigning the VID to the data unit.

In various implementations, one or more of the following features may be included. The identifier of the wireless network may be a basic service set identifier (BSSID) of the wireless network. The method of claim may further include identifying an address of the wireless access point in the data unit and determining the VID further based at least in part on the address of the wireless access point. The address of the wireless access point may an Internet Protocol (IP) address of the wireless access point.

The method may further include identifying an address of the source host in the data unit and determining the VID further based at least in part on the address of the source host. The method may further include parsing the data unit to identify an address of the target host and further determining the VID based at least in part on the address of the target host. Determining the VID based at least in part on the identifier of the wireless network may include applying at least the identifier of the wireless network as a key to a ternary content addressable memory (TCAM) as a key. The identifier of a wireless network associated with the wireless access point may correspond to a media access control (MAC) address of the wireless access point. Determining a VID based at least in part on the identifier of the wireless network may include using at least the identifier of the wireless network as a key to a hash table.

In another embodiment, a method of assigning a virtual local area network identifier (VID) to a data unit may include receiving a data unit via a wireless access point. The data unit may include a first header associated with a first networking protocol and a second header associated with a second networking protocol. The first networking protocol may be at a different protocol layer than the second networking protocol. The method may further include determining a virtual local area network identifier based at least in part on data included in the first header and on data included in the second header. The method may further include assigning the determined virtual local area network identifier to the data unit.

In another embodiment, an apparatus for assigning a virtual local area network identifier (VID) to a data unit may include a receive port configured to receive a data unit from a source host via a wireless access point. The data unit may be addressed to a target host. The apparatus may further include a Tunnel-Termination Classification Engine configured to identify an identifier of a wireless network associated with the wireless access point in the data unit to determine a VID based at least in part on the identifier of the wireless network and to assign the VID to the data unit.

Like reference numbers and designations in the various drawings indicate like elements. Furthermore, when individual elements are designated by references numbers in the form Nn, these elements may be referred to in the collective by N. For example, FIG. 1 includes hosts 105*a-g* that may be referred to collectively as hosts 105.

DETAILED DESCRIPTION

Figure 1:
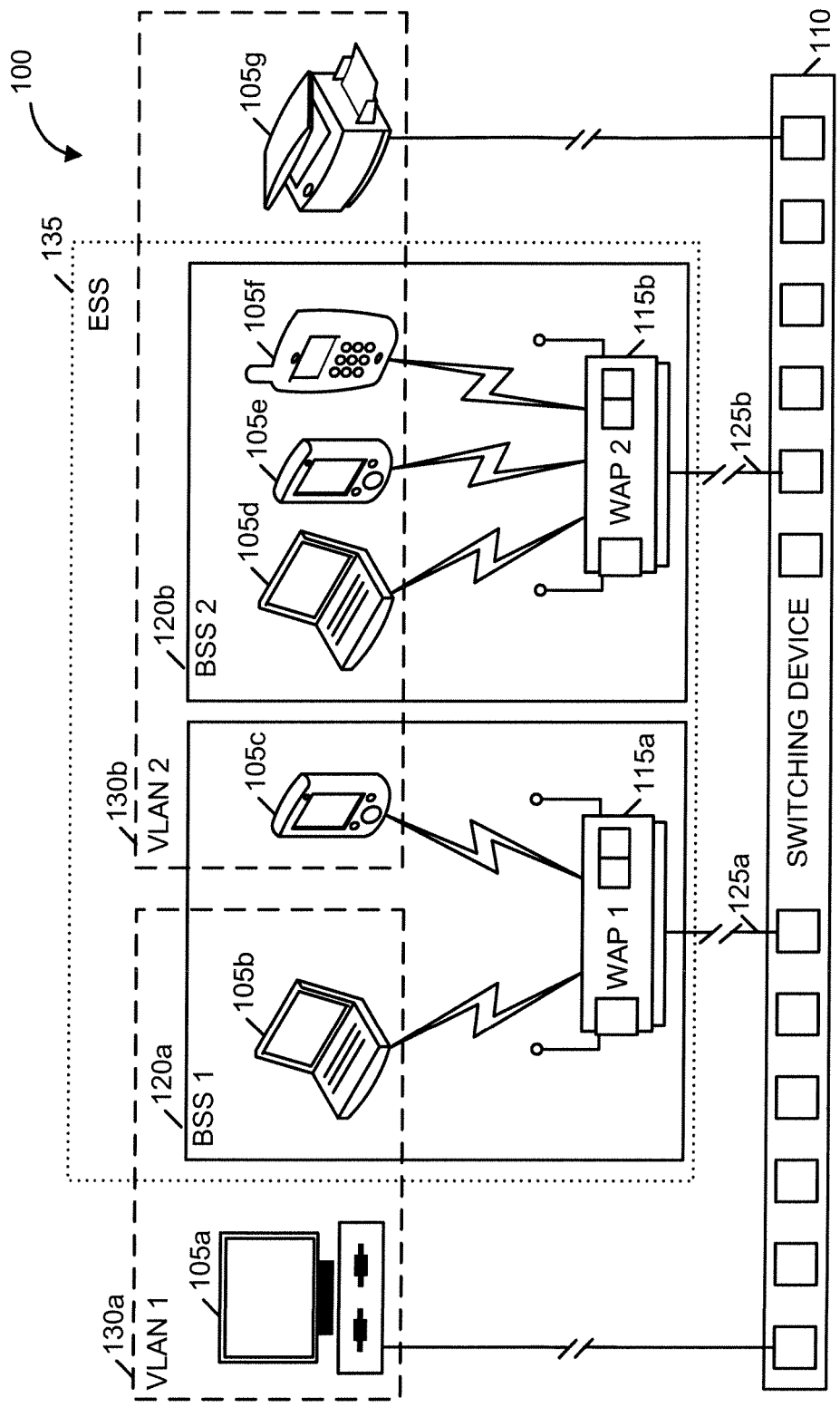
FIG. 1 is a block diagram of an example computer network that includes both wireless and wired devices.

FIG. 1 is a block diagram of an example computer network 100. The computer network 100 may include a number of hosts 105 coupled via a switching device 110. The switching device 110 generally facilitates communication between the hosts 105, as well as between other devices, systems, network segments, subnets, and so on. The switching device 110 may be located at the edge of the computer network 100, or it may be part of the network backbone interconnecting different networks. It will be appreciated that the switching device 110 is not limited to any particular protocol layer or to a particular networking technology. Moreover, the switching device 110 may operate simultaneously at multiple protocol layers, and it may couple together networks of different types, including Ethernet, Fiber Channel, Asynchronous Transfer Mode (ATM) networks, wireless local area networks, and so on.

The hosts 105 coupled via the switching device 110 may be a variety of devices and/or systems, including personal computers, laptops, printers, copier systems, scanners, personal digital assistants (PDAs), wireless devices, fax machines, and so on. The hosts 105 in the computer network 100 generally communicate with each other by sending and receiving data in data units, e.g., packets, frames, datagrams, cells, and so on. A given host 105 may act as a source host that transmits a communication and/or as a target host that receives the communication.

Hosts 105 may be coupled to the switching device 110 in a number of ways. For example, some hosts 105 may be coupled to the switching device 110 via a direct communication link. Other hosts 105 may be coupled to the switching device 110 via other network devices or systems, including other switching devices, hubs, repeaters, bridges, routers, firewalls, modems, wireless devices, and so on. Therefore, different hosts 105 may, but are not required to, be on the same local area network (LAN), the same wide area network (WAN), the same subnet, the same wireless network, and so on.

As discussed above and illustrated in FIG. 1, some hosts 105 in the computer network 100 may be mobile and/or wireless hosts, such as laptops, PDAs, and so on, that can communicate wirelessly (e.g., using radio signals). Mobile hosts 105 may be coupled to the switching device 110 via one or more a wireless access points (WAP) 115 (sometimes also referred to as "wireless termination points," or WTP). Additionally, some non-mobile hosts 105 may communicate wirelessly, and thus non-mobile hosts 105 may also communicate via a WAP 115. A WAP 115 may communicate with hosts 105 wirelessly, and the WAP 115 may communicate with the switching device 110 via a wired link, sometimes referred to as a "tunnel" 125. In some embodiments, data communicated between the WAP 115 and the switching device 110 via the tunnel 125 may be encapsulated in frames in accordance with a wireless local area network (WLAN) standard, such as one of the Institute of Electrical and Electronics Engineers (IEEE) 802.11 standards, including the draft IEEE 802.11n now being considered. Data communicated between the WAP 115 and the switching device 110 via the tunnel 125 may be further encapsulated in data messages in accordance with a tunneling protocol, such as the Internet Engineering Task Force (IETF) Standard Control and Provisioning of Wireless Access Points (CAPWAP) protocol.

In some instances, different hosts 105 in the computer network 100 may be grouped, physically and/or logically, into individual smaller networks. For example, in order to facilitate sharing of local resources, several hosts 105 that are confined to a particular physical area (e.g., a particular campus of an organization) may be grouped into a local area network (LAN). Likewise, several wireless hosts 105 coupled to the same WAP 115 (e.g., hosts 105b-c, or hosts 105d-f) may be grouped into a wireless network, sometimes referred to as a "basic service set" (BSS) 120. One or more BSSs 120 may be further grouped into an extended service set (ESS) 135, and one or more ESSs 135 may be further grouped into a wireless local area network (WLAN, not shown), e.g., in accordance with the IEEE 802.11 standard.

In some instances, in order to improve manageability and/or performance of the computer network 100, it may also be useful to group hosts 105 into logical groups, known as virtual local area networks (VLANs), e.g., in accordance with the IEEE 802.1Q standards. Hosts 105 in the same logical group (i.e., assigned to the same VLAN) may thus be able to share information with each other (e.g., via broadcast messages) without sharing that information with other hosts 105, and thus communicate in a more secure and efficient manner. Additionally, because of separation of logical host groups via VLANs, effects of one group's traffic on other groups may be minimized and network load may be controlled more effectively.

VLANs may be implemented in a number of ways. For example, in some embodiments, each VLAN in the computer network 100 may have an associated unique VLAN identifier ("VID"). Thus, when a source host 105 broadcasts a data unit on a particular VLAN, the source host 105 (via its network card, for example) may associate, or "tag" the data unit with the VID corresponding to the VLAN. For example, the source host 105 may tag the data unit with the VID. Subsequently, when network devices (like the switching device 110) receive the data unit, the network devices may use the VID to process that data unit. For example, if the switching device 110 receives the data unit, the switching device 110 may use the VID in the data unit to determine whether and where the data unit should be forwarded in the computer network 100. For instance, the switching device 110 may identify the VLAN associated with the VID and forward the received data unit to all the hosts 105 coupled to the switching device 110 that are on the same VLAN.

Some source hosts 105 may not be configured to tag data units that these hosts 105 broadcast with appropriate VIDs. For example, mobile hosts 105 that communicate in accordance with the IEEE 802.11 may not tag data units with appropriate VIDs, as this feature is generally not included in the IEEE 802.11 standard. Accordingly, these data units may be tagged with VIDs by network devices (like switching device 110) as the data units traverse the computer network 100. For example, if the switching device 110 receives a tunneling packet containing a payload with an untagged data unit, the switching device 110 may assign a VID to the payload data unit in order to determine whether and where the data unit should be forwarded. Accordingly, in some embodiments, the switching device 110 may be adapted to assign VIDs to data units.

Figure 2:
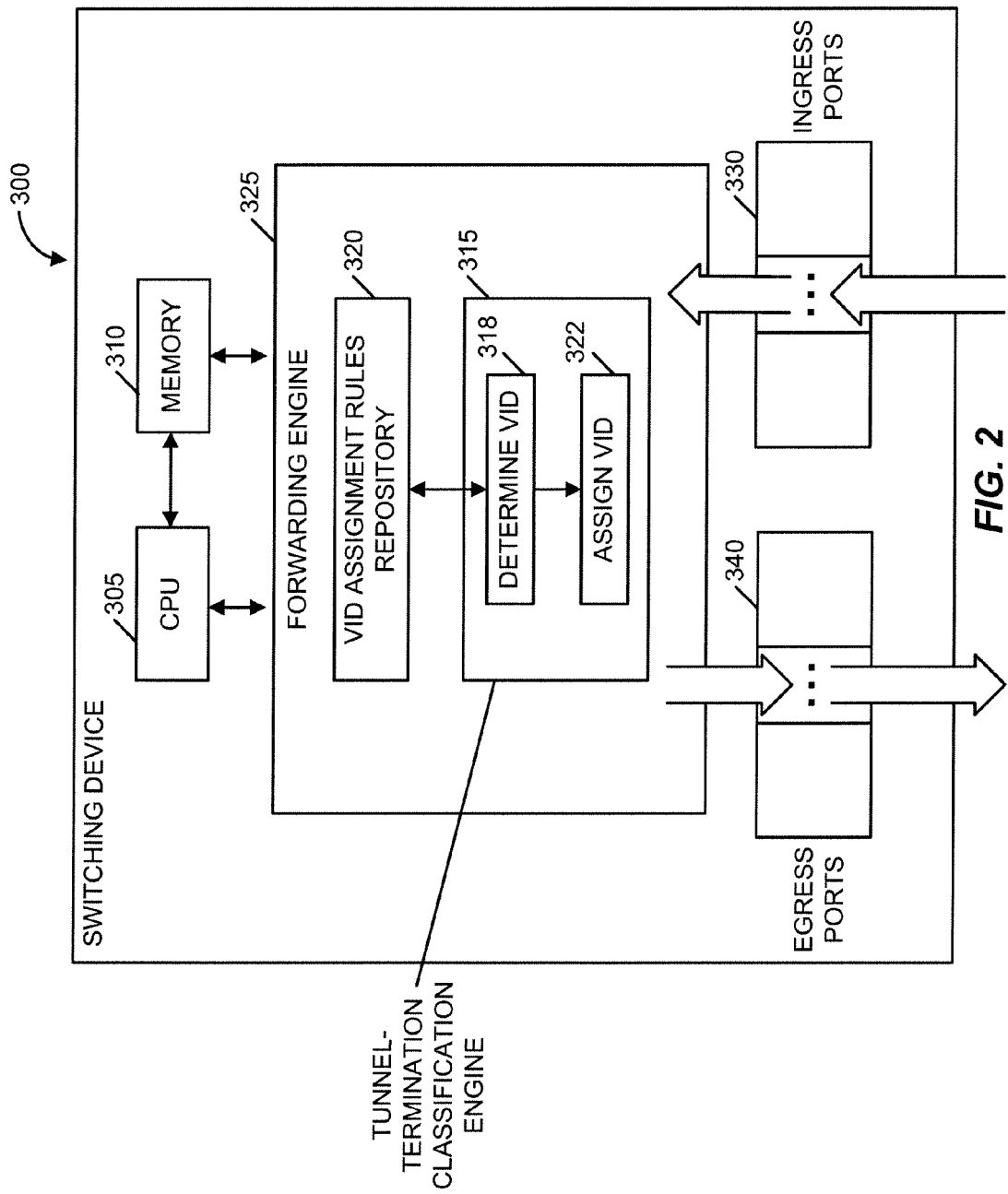
FIG. 2 is a simplified block diagram illustrating an example switching device that is adapted to identify tunneled packets, terminate the tunnel, and assign VLAN identifiers (VIDs) to untagged data units.

FIG. 2 is a simplified block diagram illustrating an example switching device 300 that is adapted to assign VIDs to untagged payload data units. The switching device 300 may be utilized in the computer network 100 as the switching device 110, for example. It will be understood, however, that the computer network 100 may alternatively use another switching device 110.

The switching device 300 includes one or more ingress ports 330 and one or more egress ports 340. The ingress ports 330 are generally for receiving data units, and the egress ports 340 are generally for transmitting data units. The ingress ports 330 and the egress ports 340 are coupled together via a forwarding engine 325, which generally transfers data units from the ingress ports 330 to appropriate egress ports 340, and which may perform additional data processing functions. The switching device 300 also may include a central processing unit (CPU) 305 coupled to the forwarding engine 325. The CPU 305 may execute computer readable instructions stored in a memory 310 coupled to the CPU 305.

The forwarding engine 325 generally performs wire speed functions associated with transferring data units from ingress ports 330 to egress ports 340, whereas the CPU 305 generally performs functions that can tolerate higher latency. The memory 310 also may be coupled to the forwarding engine 325. The forwarding engine 325 may be implemented in hardware, e.g., on a single application specific integrated circuit (ASIC) coupled to the CPU 305. In other embodiments, other types of integrated circuits may be used such as a field programmable gate array (FPGA), a programmable logic array (PLA), a custom integrated circuit, etc. In other embodiments, the forwarding engine 325 may be implemented on multiple different integrated circuits that are coupled together.

The forwarding engine 325 includes a Tunnel-Termination Classification Engine 315 configured to assign VIDs to the payload data unit of a tunneled packet that has reached its tunnel-termination point and that was received via the ingress ports 330. The Tunnel-Termination Classification Engine 315 includes a VID determination unit 318 that identifies relevant parameters in the tunnel header, CAPWAP header and/or data unit header, and, based on the identified parameters, determines an appropriate VID for the data unit. To determine the VID, the VID determination unit 318 may use a VID assignment rules repository 320 that is included in the forwarding engine 325 and which is generally configured to store rules regarding mapping parameters in the received data units to a corresponding VID. Once the Tunnel-Termination Classification Engine 315 determines the VID for the data unit, a VID assignment unit 322 assigns the determined VID to the data unit.

Figure 3:
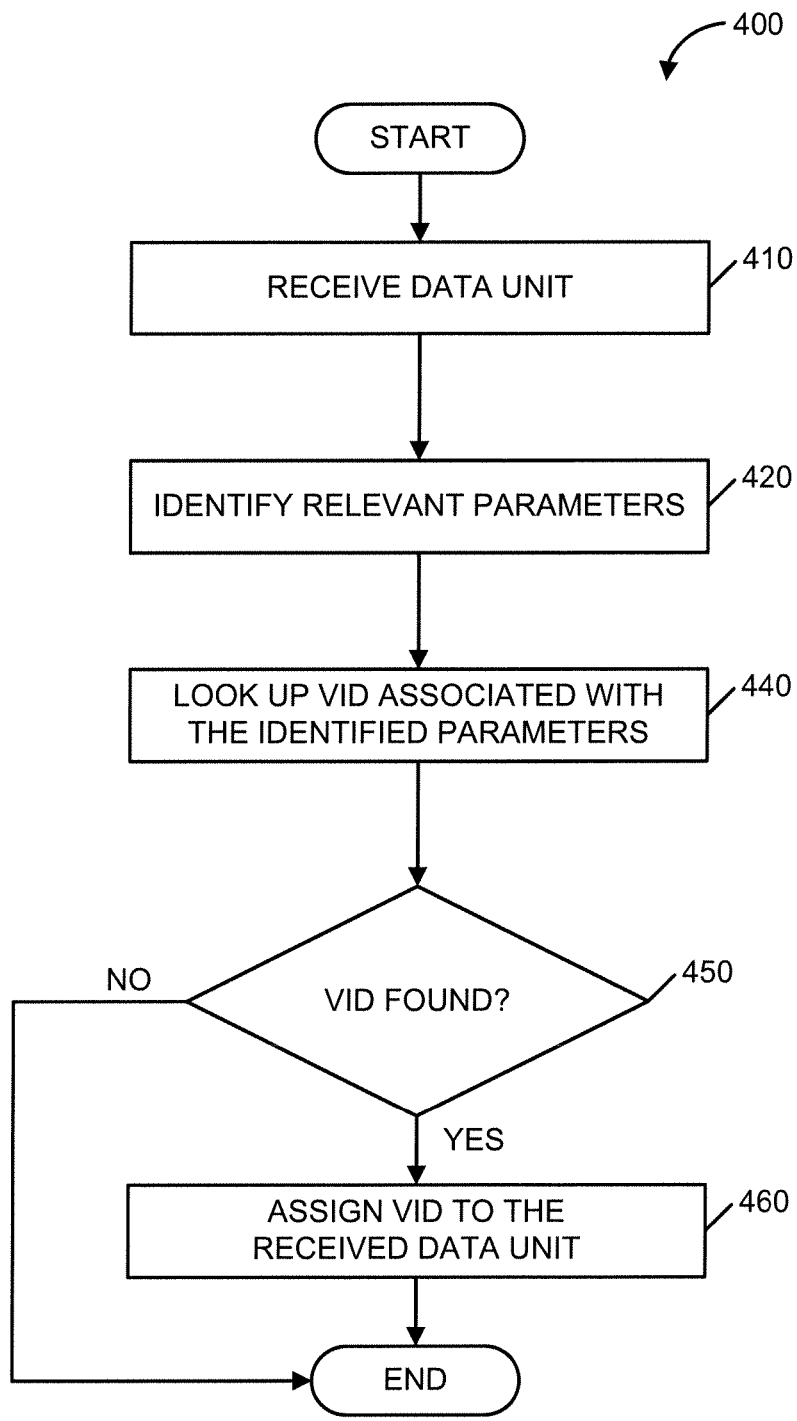
FIG. 3 is a flow diagram illustrating an example method for assigning a VID to an untagged payload data unit.

FIG. 3 is a flow diagram illustrating an example method 400 for assigning a VID to a data unit that may be performed, for example, by the Tunnel-Termination Classification Engine 315. For ease of explanation, FIG. 3 will be described with reference to FIGS. 1-2. It will be understood, however, that the method 400 may be utilized with systems and devices other than those illustrated in FIGS. 1-2.

Referring again to FIG. 3, when a switching device (e.g., switching device 300) receives a data unit (block 410), the switching device 300 uses the Tunnel-Termination Classification Engine 315 to terminate the tunnel and assign a VID to the data unit. In particular, the Tunnel-Termination Classification Engine 315 identifies within the data unit (e.g., in the CAPWAP header, in the payload 802.11 MAC header, and so on) parameters relevant to assigning a VID to the data unit.

Various parameters within the received data unit (e.g., in CAPWAP and the 802.11 MAC headers) may be identified as relevant for assigning a VID to the data unit. For example, if the data unit is received via a WAP 115 from a mobile source host 105 within a particular BSS 120, an identifier of that BSS 120 (BSSID) included in the 802.11n MAC header of the data unit may be identified as a relevant parameter for assigning a VID to the data unit. Likewise, the MAC address of the mobile source host 105 and the MAC address of the target host 105 may be identified as relevant parameters for assigning a VID to the data unit. Furthermore, various other parameters, including, for example, the IP address of the WAP 115, may be identified as relevant for assigning a VID to the data unit.

After identifying relevant parameters in the received data unit (block 420), the Tunnel-Termination Classification Engine 315 may use the VID assignment rules repository 320 to look up a VID associated with the identified parameters (block 440). As explained above in reference to FIG. 2, the VID assignment rules repository 320 generally stores rules for mapping the parameters of a data unit (such as those identified in block 420) to a VID. For example, in some embodiments, the VID assignment rules repository 320 may store a list of VIDs corresponding to different combinations of identified BSSIDs and WAP IP addresses. Additionally, or alternatively, the VID assignment rules repository 320 may store a list of VIDs that correspond to different combinations of identified BSSIDs, source host MAC addresses and destination host MAC addresses. It should be understood that various other combinations of parameters of a data unit may be stored in the VID assignment rules repository 320 and mapped to different VIDs.

The VID assignment rules repository 320 may be implemented in a number of ways. In some embodiments, the VID assignment rules repository 320 may include a ternary content addressable memory (TCAM) or other suitable memory. In these embodiments, the Tunnel-Termination Classification Engine 315 may use one or more parameters of data units (such as those identified in block 420) as a key to the TCAM. Optionally, VID assignment rules repository 320 may include or utilize one or more additional memory components such as a static random access memory (SRAM). For example, an entry in the TCAM may point to a particular location in an SRAM that includes information for assigning a VID.

If a valid VID is found in VID assignment rules repository 320 ("YES" branch of block 450), the Tunnel-Termination Classification Engine 315 assigns that VID to the data unit (block 450). In some implementations, assigning the VID to a data unit may include converting an 802.11 payload frame to an 802.3 Ethernet frame with a VID tag.

Figure 4:
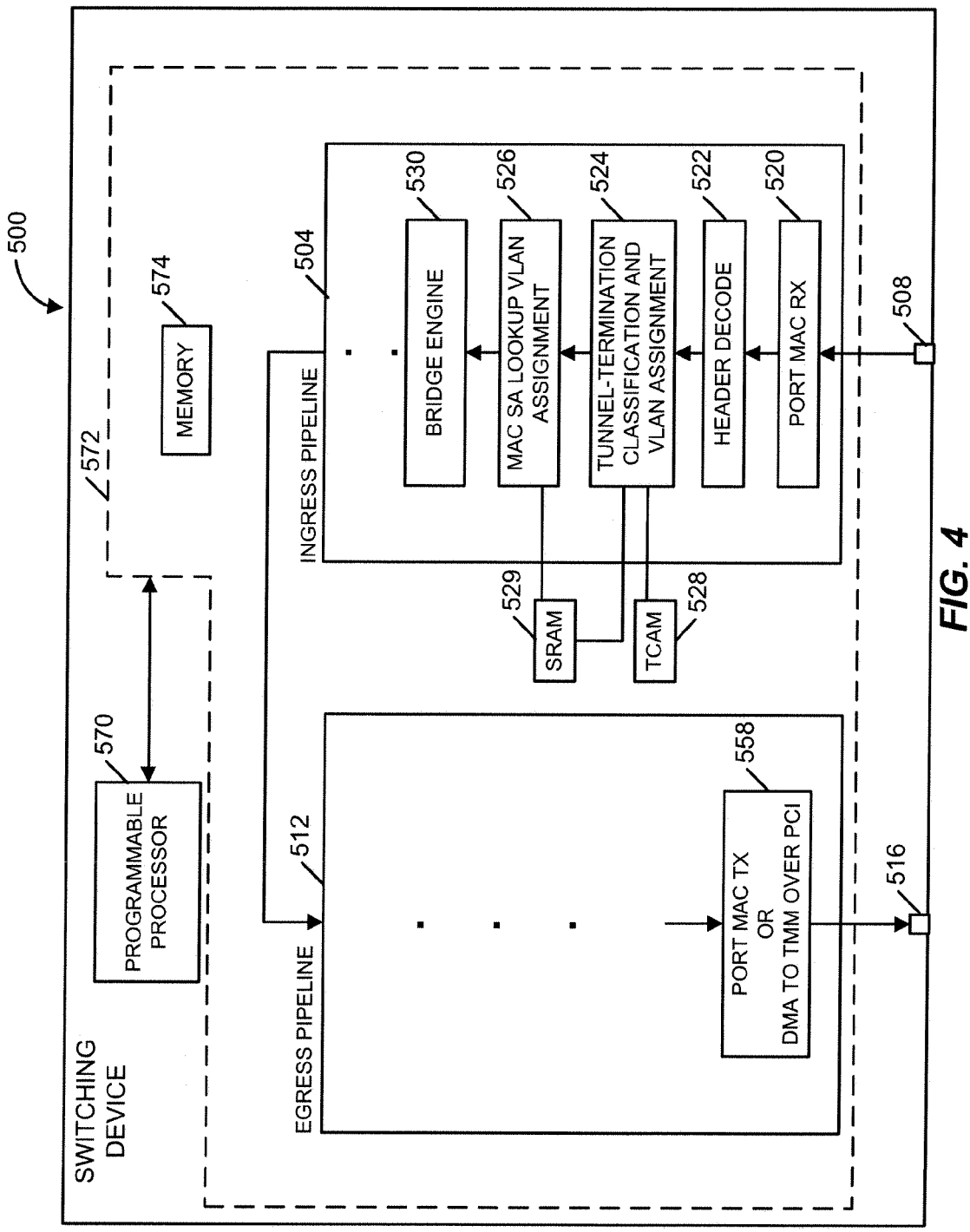
FIG. 4 is a simplified block diagram illustrating another example switching device that is adapted to assign VIDs to untagged data units.

FIG. 4 is a simplified block diagram illustrating another example switching device 500 that includes VID-assigning capabilities. The switching device 500 includes a pipeline that may be implemented as an ingress pipeline 504 and an egress pipeline 512. The ingress pipeline 504 is coupled to one or more input circuits 508, and the egress pipeline 512 is coupled to one or more output circuits 516. Additionally, the ingress pipeline 504 and the egress pipeline 512 are coupled together. The input circuits 508 and the output circuits 516 may be coupled to one or more networks such as a wide area network (WAN), a local area network (LAN), such a wired LAN or a wireless LAN (WLAN), etc. The one or more input circuits 508 are for receiving data units such as packets. Similarly, the one or more output circuits 516 are for transmitting data units. The ingress pipeline 504 and the egress pipeline 512 generally transfer packets of data from the input circuits 508 to appropriate ones of the output circuits 516. The one or more input circuits 508 may correspond to one or more input ports of the switching device 500, and the one or more output circuits 516 may correspond to one or more output ports of the router 500.

As shown in FIG. 4, the ingress pipeline 504 and the egress pipeline 512 each include a plurality of units coupled in series. Generally, each unit of a pipeline optionally processes a packet descriptor corresponding to a packet, or some other information associated with the packet, or the packet itself, and then passes the packet descriptor, the associated information, or the packet, to the next unit in the pipeline. For ease of explanation, the following description will refer only to processing and passing packet descriptors. A packet descriptor may include some information from the packet, such as some or all of the header information of the packet. The packet descriptor may include other information as well such as an indicator of where the packet is stored in a memory associated with the switching device 500. Each unit may or may not process a particular packet descriptor. For example, in some instances, a unit may simply forward a packet descriptor onto the next unit in the pipeline. The last unit of the ingress pipeline 504 passes the packet descriptor to the first unit of the egress pipeline 512.

Each or at least some of the units of the ingress pipeline 504 and the egress pipeline 512 may include, or otherwise be associated with, a corresponding memory. A packet descriptor received by a unit may be stored in the memory associated with the unit.

The ingress pipeline 504 includes a port media access control (MAC) receiver unit 520 coupled to the input circuits 508. The port MAC receiver unit 520 generally implements media access control functions. A header decode unit 522 is coupled to the port MAC receiver unit 520 and generally decodes the header of each packet received via the input circuits 508. This may include parsing or identifying different segments of the header for use by subsequent units in the ingress pipeline 504 and, optionally, units in the egress pipeline 512.

A Tunnel-Termination classification unit 524 is coupled to the header decode unit 522. The Tunnel-Termination classification unit 524 generally performs two lookup functions. A first lookup function (a tunnel termination interface (TTI) lookup) may be used for tunnel termination identification and/or classifying a logical interface according to L2 or L3 header fields. In a second lookup function, a VID associated with the packet may be determined based on various parameters in the header of the packet (e.g., BSSID of the source host that transmitted the packet and the IP address of the WAP via which the packet was received), as discussed in reference to FIG. 4. This determined VID may be used in one or more subsequent functions or pipeline units.

In some embodiments, the Tunnel-Termination classification unit 524 may include, or be coupled to, a ternary content addressable memory (TCAM) 528 or other suitable memory. In these embodiments, the Tunnel-Termination classification unit 524 may perform a tunnel termination (TT) lookup, which may include using header parameters of the packet being processed, and possibly other information, as a key to the TCAM 528, as discussed in reference to FIG. 4. Optionally, the TT lookup may utilize one or more additional memory components such as a static random access memory (SRAM) 529. For example, an entry in the TCAM 528 may point to a particular location in an SRAM 529, and the TT lookup may include retrieving information from the SRAM 529. The TT lookup may indicate that the packet should be associated with one or more TT actions, such as assigning a particular VID, quality of service (QoS) parameters, etc., to the packet.

In some embodiments, the TT lookup may include a hash-based lookup table, or a hash map (not shown). In these embodiments, the TT lookup may include using header parameters of the packet being processed, and possibly other information, as a key to the hash table to identify. The hash table may provide a VID corresponding to the key.

A MAC source address (SA) lookup VLAN assignment unit 526 is coupled to the Tunnel-Termination classification unit 524. The MAC SA lookup VLAN assignment unit 526 may use the MAC source address of the 802.11 payload of the tunnel-terminated packet, and possibly other information, to determine a VID and override the VID assigned by the TT lookup. The MAC SA lookup VLAN assignment unit 524 may override other attributes of the packet, such as the quality of service (QoS) parameters.

A bridge engine 530 is coupled to the MAC source address (SA) lookup VLAN assignment unit 526. The bridge engine 530 includes, or is coupled to, a forwarding database (not shown) that includes MAC destination addresses and indications of their corresponding network segments. The bridge engine 530 generally handles the forwarding of packets destined for a segment of a network, or a VLAN to which the switching device 500 is connected. The bridge engine 530 determines whether a received packet should be forwarded to a different network segment, or VLAN, and, if so, to which network segment or VLAN the packet should be forwarded. Determination of whether, and to where a packet should be forwarded, may be done in part by examining the VID and determining to which VLAN the VID corresponds using the forwarding database. Additionally, or alternatively, determination of whether, and to where a packet should be forwarded, may be done in part by examining the MAC destination address of the packet and determining to which network segment the destination address corresponds using the forwarding database.

The bridge engine 530 is coupled to egress pipeline 512 via one or more other ingress pipeline units, which are omitted from FIG. 4 for ease of explanation and so as not to obscure teachings of the present application. Likewise, the egress pipeline 512 may include a plurality of pipeline units that have been omitted from FIG. 4 for similar reasons. The egress pipeline 512 may include a port MAC transmit unit 558. The port MAC transmit unit 558 generally implements media access control functions and forwards tagged packets to the output circuits 516.

The switching device 500 also includes a programmable processor 570 coupled to the ingress pipeline 504 and the egress pipeline 512. The programmable processor 570 may be implemented by a central processing unit (CPU) configured according to computer readable instructions stored on a memory coupled to the CPU. On the other hand, the ingress pipeline 504, the egress pipeline 512, and other units of the switching device 500 described above may be implemented on a single application specific integrated circuit (ASIC) 572 coupled to the CPU. In other embodiments, other types of integrated circuits may be used such as a field programmable gate array (FPGA), a programmable logic array (PLA), a custom integrated circuit, etc. In other embodiments, the ingress pipeline 504 and the egress pipeline 512 or various modules in the pipelines 504, 512 may be implemented on multiple different integrated circuits that are coupled together.

Although VID-assigning techniques were described above with reference to the switching device 500, these techniques may be utilized in other types of packet forwarding devices such switching devices different than the switching device 500, routers, network bridges, etc. Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method in a switching device of assigning a virtual local area network identifier (VID) to a data unit, the method comprising:

receiving, at the switching device, a tunneled packet from a source host via a wireless access point, wherein the tunneled packet includes (i) a data unit (a) that is addressed to a target host and (b) that includes a wireless header, and (ii) one or more headers encapsulating the data unit according to a tunneling protocol;

removing, with the switching device, the one or more headers encapsulating the data unit from the tunneled packet;

analyzing, with the switching device, the wireless header of the data unit to identify, in the wireless header, an identifier of a wireless network;

using (i) the identifier of the wireless network and (ii) at least one additional parameter included in the packet to determine, with the switching device, a VID; and associating, with the switching device, the data unit with the VID.

2. The method of claim 1, wherein the identifier of the wireless network is a basic service set identifier (BSSID) of the wireless network.

3. The method of claim 1, further comprising:
identifying, with the switching device, an address of the wireless access point in the data unit; and
wherein using (i) the identifier of the wireless network and (i) at least one additional parameter included in the packet to determine, with the switching device, the VID comprises using the identifier of the wireless network and the address of the wireless access point to determine the VID.

4. The method of claim 3, wherein the address of the wireless access point is an Internet Protocol (IP) address of the wireless access point.

5. The method of claim 1, further comprising:
identifying, with the switching device, an address of the source host in the data unit; and
wherein using (i) the identifier of the wireless network and (i) at least one additional parameter included in the packet to determine, with the switching device, the VID comprises using the identifier of the wireless network and the address of the source host to determine the VID.

6. The method of claim 5, further comprising:
parsing, with the switching device, the data unit to identify an address of the target host; and
wherein using (i) the identifier of the wireless network and (i) at least one additional parameter included in the packet to determine, with the switching device, the VID comprises using the identifier of the wireless network and the address of the target host to determine the VID.

7. The method of claim 1, wherein using (i) the identifier of the wireless network and (ii) at least one additional parameter included in the packet to determine the VID includes applying at least the identifier of the wireless network and the at least one additional parameter as a key to a ternary content addressable memory (TCAM).

8. The method of claim 1, wherein the identifier of the wireless network associated with the wireless access point corresponds to a media access control (MAC) address of the wireless access point.

9. The method of claim 1, wherein using (i) the identifier of the wireless network and (ii) at least one additional parameter included in the packet to determine the VID includes using the identifier of the wireless network and the at least one additional parameter as a key to a hash table.

10. The method of claim 1, wherein associating the data unit with the VID includes adding, with the switching device, the VID to the data unit.

11. A method in a switching device of assigning a virtual local area network identifier (VID) to a data unit, the method comprising:
receiving, at the switching device, a tunneled packet via a wireless access point, wherein the tunneled packet includes (i) a data unit having a first header associated with a wireless networking protocol and (ii) a second header encapsulating the data unit and associated with a tunneling protocol;
removing, with the switching device, the second header from the tunneled packet;
analyzing, with the switching device, the first header of the data unit to identify, in the first header, an identifier of a wireless network associated with the wireless access point;
using (i) the identifier of the wireless network, and (ii) data included in the second header to determine, with the switching device, a VID; and
associating, with the switching device, the data unit with the VID.

12. The method of claim 11, wherein the wireless networking protocol is a wireless media access control (MAC) protocol.

13. The method of claim 12, wherein the wireless MAC protocol is one of a family of IEEE 802.11 MAC protocols.

14. The method of claim 11, wherein the tunneling protocol is a wireless tunneling protocol.

15. The method of claim 14, wherein the wireless tunneling protocol is a CAPWAP protocol.

16. The method of claim 11, wherein using (i) the identifier of the wireless network and (ii) the data included in the second header to determine the VID further includes using an address of the wireless access point included in the second header to determine, with the switching device, the VID.

17. The method of claim 16, wherein the address of the wireless access point is an Internet Protocol (IP) address of the wireless access point.

18. The method of claim 11, wherein associating the data unit with the VID includes adding, with the switching device, the VID to the data unit.

19. An apparatus for associating a data unit with a virtual local area network identifier (VID), the apparatus comprising:
a receive port configured to receive a tunneled packet from a source host via a wireless access point, wherein the tunneled packet includes (i) a data unit addressed to a target host and (ii) one or more headers encapsulating the data unit according to a tunneling protocol; and
a processing engine configured to:
remove from the tunneled packet the one or more headers encapsulating the data unit;
analyze the data unit to identify, in the data unit, an identifier of a wireless network associated with the wireless access point;
use (i) the identifier of the wireless network and (ii) at least one additional parameter included in the packet to determine a VID; and
associate the data unit with the VID.

20. The apparatus of claim 19, wherein the processing engine is configured to associate the data unit with the VID at least in part by assigning the VID to the data unit.

21. The apparatus of claim 19, wherein the processing engine is a Tunnel-Termination Classification Engine.

* * * * *